(12) United States Patent
Bundock et al.

(10) Patent No.: US 6,567,755 B1
(45) Date of Patent: May 20, 2003

(54) METERING EQUIPMENT

(75) Inventors: Ronald Michael Bundock, Buckingham (GB); James William Evett, Winslow (GB)

(73) Assignee: Assembly Technology & Test Limited, London (GB)

( * ) Notice: Subject to any disclaimer, the term of this patent is extended or adjusted under 35 U.S.C. 154(b) by 0 days.

(21) Appl. No.: 09/656,570

(22) Filed: Sep. 7, 2000

(30) Foreign Application Priority Data

Sep. 8, 1999 (GB) ................................ 9921141

(51) Int. Cl.[7] ................... G01F 1/00; G01F 3/02
(52) U.S. Cl. ................... 702/45; 73/784; 73/119 A; 73/232; 123/533; 222/194; 210/19; 239/124; 436/63
(58) Field of Search ................ 702/45, 46, 47, 702/48, 49, 50, 62, 100; 73/119 A, 784; 701/99; 123/389, 446, 467, 478, 533; 210/19; 222/37, 194; 436/63

(56) References Cited

U.S. PATENT DOCUMENTS

| | | | |
|---|---|---|---|
| 3,675,827 A | * 7/1972 | Bailly | 222/194 |
| 3,929,413 A | * 12/1975 | Young et al. | 436/63 |
| 4,213,435 A | * 7/1980 | Simko | 123/389 |
| 4,386,716 A | * 6/1983 | Buck | 222/37 |
| 4,426,977 A | * 1/1984 | Taplin et al. | 123/446 |
| 4,467,767 A | * 8/1984 | Kampichler et al. | 123/467 |
| 4,531,672 A | * 7/1985 | Smith | 239/89 |
| 4,714,998 A | * 12/1987 | Bussey et al. | 701/99 |
| 4,733,568 A | * 3/1988 | Koopmans et al. | 73/784 |
| 4,840,163 A | * 6/1989 | Alsobrooks et al. | 123/533 |
| 5,379,740 A | * 1/1995 | Moore et al. | 123/478 |
| 5,415,767 A | * 5/1995 | Schuler et al. | 210/19 |
| 5,479,020 A | * 12/1995 | Mohn | 250/356.1 |
| 5,553,490 A | * 9/1996 | Nicholls et al. | 73/119 A |
| 5,860,597 A | * 1/1999 | Tarr | 239/124 |
| 6,079,393 A | * 6/2000 | Tsutsumi et al. | 123/478 |

* cited by examiner

*Primary Examiner*—Kamini Shah
*Assistant Examiner*—John Le
(74) *Attorney, Agent, or Firm*—Blackwell Sanders Paper Martin LLP

(57) ABSTRACT

Metering equipment for metering fluid flow through an injector valve, comprising metering means and locating means arranged to locate such a valve in fluid communication with the metering means. The metering means are upstream of the locating means.

19 Claims, 1 Drawing Sheet

METERING EQUIPMENT

BACKGROUND OF THE INVENTION

The present invention relates to metering equipment for metering fluid flow through an injector valve, comprising metering means and locating means arranged to locate such a valve in fluid communication with the metering means.

Such metering equipment is described in GB-A-2233101, in which a diesel engine injection pump injects fluid into a measuring chamber via an injection nozzle, whereby the volumes of successive injections can be measured.

One problem encountered by such metering equipment is the effect of the measuring chamber on the metering.

The present invention seeks to obviate this disadvantage.

SUMMARY OF THE INVENTION

Accordingly, the present invention is directed to metering equipment according to the opening paragraph of the present specification, in which the metering means are upstream of the locating means.

Rapid and accurate metering of fluid flow through the injector valve is thereby made possible.

An advantage of such a construction is that the injector valve is itself used to drain fluid from the metering means.

Preferably, the metering equipment is for metering the fluid flow through a solenoid-operated petrol injection valve.

In an especially advantageous embodiment of the present invention, the metering equipment is volumetric metering equipment, and the metering means measure the volume of one or more injections through the injector valve.

The metering means may be so constructed as to act as a pump to cause the flow of fluid through the injector valve. This may be achieved especially effectively if the metering means are in the form of a piston and cylinder arrangement such that the cylinder provides a measuring chamber and linear movement of the piston is indicative of the volume of fluid which flows through the valve. The piston may have a relatively low cross-sectional area to give a relatively large movement for a given flow throughput.

Advantageously a source of fluid under pressure is connected to the measuring chamber side of the piston. A further source of fluid under pressure may be connected to a chamber on the other side of the piston. The fluid from this further source may be gaseous, to act more effectively as a spring urging the piston towards the valve when the equipment is in use whilst still maintaining pressure within a predetermined range, although it may be oil.

The equipment may further comprise a magnetic induction device, or a linear variable differential transformer or a diffraction grating or other optical device, to provide a measure of the linear movement of the piston, and such measuring means may be external to the chamber.

The equipment may be provided with control means to effect an injection operation of the valve. Also the equipment may have adjustment means to adjust the valve, and it may have programmable or hard-wired servo loop means to adjust the valve until the volume of an injection as measured by the equipment is within a predetermined range.

The equipment may further comprise crimping means to crimp the valve, and thus fix it with the given adjustment, once that volume is within that range.

The present invention extends to a method of metering fluid flow through an injector valve in which fluid flow upstream of the valve is metered.

DETAILED DESCRIPTION OF THE INVENTION

Figure 1:
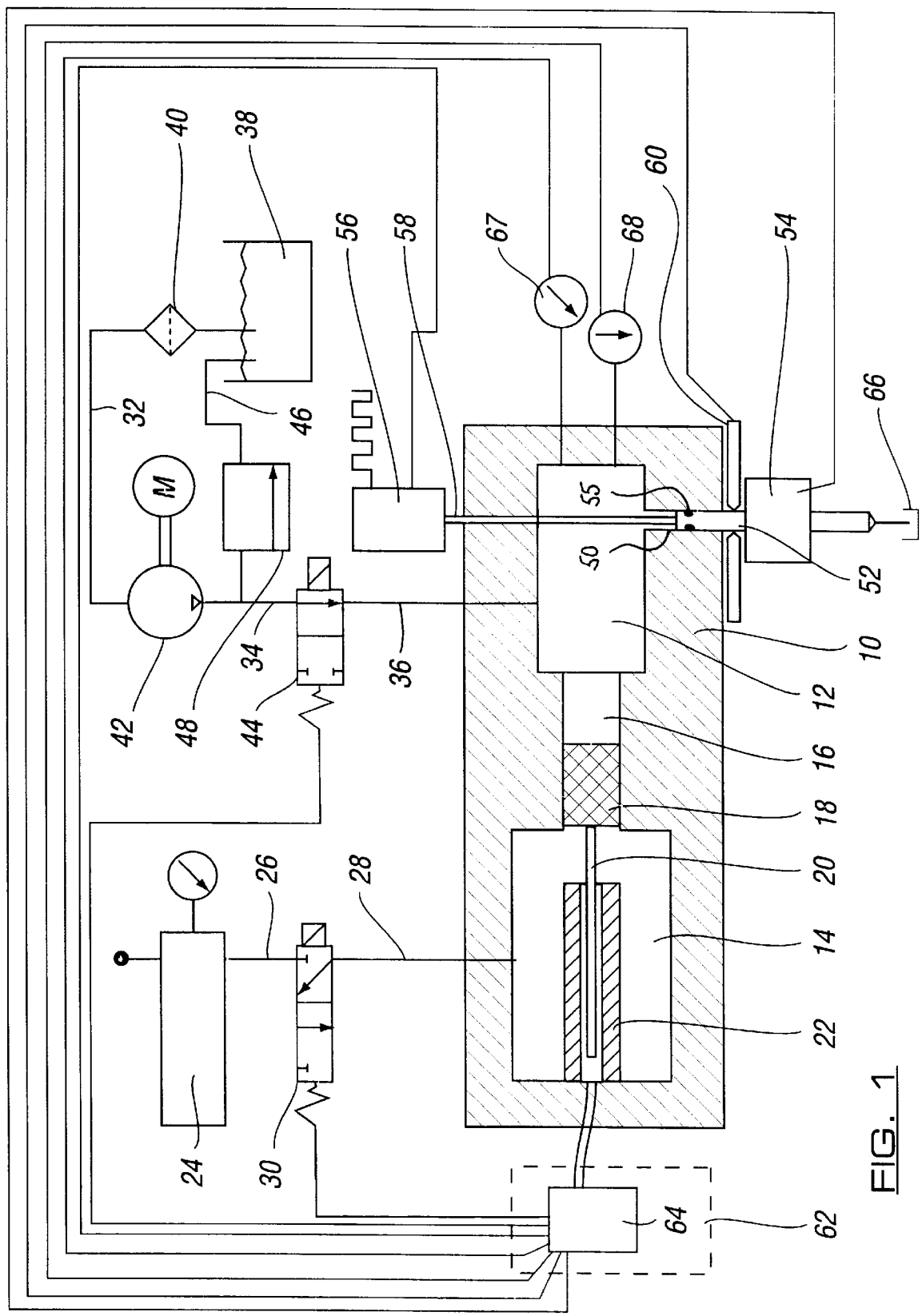
FIG. 1 shows a part axial-sectional part diagrammatic view of an example of metering equipment made in accordance with the present invention.

An example of metering equipment made in accordance with the present invention will now be described in greater detail with reference to the accompanying drawing, the only Figure of which shows a part axial-sectional part diagrammatic view of such equipment.

The equipment shown in the Figure comprises a hollow cylindrical body 10 the hollow of which comprises cylindrical end chambers 12 and 14 at opposite ends of the body 10, and a cylindrical precision bore 16 extending between and interconnecting the chambers 12 and 14.

A close tolerance sliding piston 18 is slidably located within the bore 16. The tolerance is sufficiently close to ensure that substantially no leakage of fluid will occur between the piston 18 and the wall of the bore 16 even when a considerable pressure differential is present across the piston 18.

A probe 20 is secured to and extends from the piston 18 into a linear variable differential transducer (LVDT) 22 located within the chamber 14, so that linear axial movement of the piston 18 along the bore 16 produces a corresponding electrical signal from the LVDT 22.

The piston 18 and bore 16, together with the chamber 12, and the probe 20 and LVDT 22 arrangement, constitute metering means.

A high pressure gas reservoir 24 is connected via high pressure gas conduits 26 and 28 and an electrically operable solenoid valve 30 to feed a gaseous fluid under stable pressure to the chamber 14.

Test oil conduits 32, 34, and 36 connect a test oil reservoir 38 to deliver test oil at a given temperature to the chamber 12 via a filter 40, a pump 42 and a further electrically operable solenoid valve 44. A return conduit 46 connects the conduit 34, which is downstream of the pump 42, back to the reservoir 38 via a pressure control valve 48.

Locating means in the form of a bore 50 through the body 10 into the chamber 12 are provided whereby the fluid input end 52 of a solenoid operated petrol injection valve 54 can be located in fluid communication with chamber 12 and hence with bore 16, the input end 52 being sealed within the bore 50 by an O-ring 55. The metering means constituted by the piston 18 and the bore 16, together with the chamber 12 and the probe 20 and the LVDT 22, are therefore upstream of the locating means in the form of the bore 50.

A stepper motor 56 is arranged to adjust a screw threaded adjustment on the injection valve 54, which adjusts the amount of fluid which passes through the latter when its solenoid is operated, by stepwise rotation of a probe 58 which extends from the motor 56 and is connected to the injection valve 54 to adjust the latter when the equipment is in use.

A crimping device 60 is positioned adjacent to the bore 50, to embrace the input end 52 of the injection valve 54, so as to be able to crimp that end 52 when operated and thereby fix the adjustment in the setting it has at the time of crimping.

A printed circuit board 62 is provided with a control microprocessor 64 to which are electrically connected the LVDT 22, the injection valve 54, the solenoid valves 30 and 44, the stepper motor 56 and the crimping device 60.

Sensors 67 and 68 are provided to measure the temperature and pressure respectively of test oil near the injection valve 54, and apply correction factors accordingly at the processor 64.

In operation, with the injection valve 54 installed as indicated in the Figure and the piston 18 at its start end of travel at the end of the bore 16 which is closer to the chamber 14, and the bore 16 as well as the chamber 12 filled with test oil at a pressure determined by the high pressure gas in the chamber 14, and with the solenoid valve 44 closed and the solenoid valve 30 open, the control microprocessor 64 executes a first step in a program routine comprising the operation of the injection valve 54. As a result, the gas pressure acting on the piston 18 urges the latter along the bore 16 towards the chamber 12 as test oil shoots through the injection valve 54 from the chamber 12, until the injection valve 54 is once again closed after a brief injection period. The gas pressure changes only by an insignificant amount because the reservoir 24 is relatively large. The consequent linear displacement of the piston 18 therefore provides a measure of the volume of fluid vented by the injection valve 54, and hence the amount of fluid that the latter would have injected into a cylinder of a petrol injection engine had it been installed therein.

This measure is communicated to the control microprocessor 64 by virtue of the electrical connection of the LVDT 22 thereto. At this stage, or alternatively after an average of a plurality of injection measures has been obtained, the processor 64 operates the stepper motor 56 to adjust the injection valve 54 according to the extent of variance between the measure obtained and a predetermined value stored within the processor 64. A further operation of the injection valve 54 ensues and any required further adjustment of the latter is effected. Once the measure obtained is within a predetermined range of tolerance stored within the processor 64, the latter operates the crimping device 60 to set the injection valve 54 with that desired adjustment.

In the event that the desired adjustment is not obtained before the piston 18 reaches its end of travel within the bore 16 closer to the chamber 12, the solenoid valve 44 is opened to feed test oil into the chamber 12 while the injection valve 54 remains closed, to drive the piston 18 back to its starting position, whereafter further measurements can be made. During this time, any drop in pressure of the gas in the reservoir 24 may be made good by means of a high pressure gas source not shown.

Since the piston 18 is close to the valve 54 under test, there is a very close correspondence between flow and movement of the piston 18.

The test oil which exits the injection valve may simply vent to atmosphere, or to a collecting vessel 66, or further equipment may be positioned around the nozzle end of the injection valve to check for example the characteristics of its spray. Alternatively the nozzle end of the injection valve 54 may be inserted and sealed in a chamber to create any back pressure which may be desired in the calibration process.

The pressure of the gas in the chamber 14 may be in the range from 2 to 5 bar for metering fluid flow through a port injector, or 50 bar or more for metering fluid flow through a direct injection metering valve.

Numerous variations and modifications to the illustrated equipment may occur to the reader without taking the resulting construction outside the scope of the present invention. For example a diffraction grating arrangement may be used instead of the LVDT 22. Further, a magnetic induction device could be used to measure the linear movement of piston 18. The stepper motor 56 could be arranged within the chamber 12 to avoid the need for any seal around the probe 58. A low force seal may surround the piston 18 to provide a damping effect in relation to axial linear movement thereof. Further sources (not shown) of high pressure gas may be connected to the chamber 14, via respective shut-off valves (not shown), to enable the pressure in the chamber 14 to be altered to suit different valves under test. Temperature controlling passages (not shown) for the flow of a heat exchange medium through the body 10 may be provided to maintain the temperature of the test oil in the chamber 12 at a desired value. Pressure fluctuations in the chamber 12 may be reduced by providing a gas volume (not shown) in that chamber. The stepper motor 56 may be provided with a screw-threaded arrangement (not shown) or other means to convert its rotary motion to a linear movement in the event that the injection valve 54 has a slidable setting slug that needs to be adjusted linearly rather than rotated, before it is crimped to hold it in the desired setting.

We claim:

1. Metering Equipment for metering fluid flow through an injector valve, comprising a metering device in fluid communication with said injector valve; and wherein a locator is adapted to receive said injector valve and position the injector valve downstream from said metering device;

wherein said metering equipment is volumetric metering equipment, and the metering device is adapted to measure the volume of one or more injections through the injector valve; wherein the metering device is adapted as to act as a pump to cause the flow of fluid through the injector valve; and further comprising control means to effect an injection operation of the valve.

2. Metering equipment according to claim 1, wherein said injector valve is a solenoid-operated petrol injection valve.

3. Metering equipment according to claim 1, wherein the metering device comprises a piston and cylinder arrangement such that the cylinder provides a measuring chamber and linear movement of the piston is indicative of the volume of fluid that flows through the valve.

4. Metering equipment according to claim 3, wherein a source of fluid under pressure is connected to the measuring chamber side of the piston.

5. Metering equipment according to claim 4, wherein a further source of fluid under pressure is connected to a chamber on the side of the piston opposite the measuring chamber.

6. Metering equipment according to claim 5, wherein the fluid from said further source is gaseous, so as to act more effectively as a spring urging the piston towards the valve when the equipment is in use whilst still maintaining pressure within a predetermined range.

7. Metering equipment according to claim 1, wherein the metering device comprises a piston and cylinder arrangement and the metering device further comprises a magnetic induction device electronically coupled to the piston to provide a measure of the linear movement of the piston.

8. Metering equipment according to claim 1, wherein the metering device comprises a piston and cylinder arrangement and the metering device further comprises a linear variable differential transformer electronically coupled to the piston to provide a measure of the linear movement of the piston.

9. Metering equipment according to claim 1, wherein the metering device comprises a piston and cylinder arrangement and the metering device further comprises an optical device electromagnetically coupled to the piston to provide a measure of the linear movement of the piston.

10. Metering equipment according to claim 9, wherein said optical device comprises a diffraction grating.

11. Metering equipment according to claim 1, wherein the equipment is provided with control means to effect an injection operation of the valve.

12. Metering equipment according to claim 1, wherein the equipment has an adjustment means to adjust the valve.

13. Metering equipment according to claim 12, wherein the equipment has a programmable or hard-wired servo loop to adjust the valve until the volume of an injection as measured by the equipment is within a predetermined range.

14. Metering equipment according to claim 1, wherein the equipment further comprises crimping means to crimp the valve, and thus fix the valve once a preselected volume is within a predetermined range.

15. A method of metering fluid flow through an injector valve comprising:
  allowing the fluid to flow through a metering device in fluid communication with the injector valve and upstream of the fluid flow is metered prior to the fluid entering the injector valve, the metering device acting to pump the fluid through the injector valve; and
  controlling the valve to cause an injection operation thereof.

16. Metering equipment for metering fluid flow through an injector valve comprising a metering device in fluid communication with said injector valve; and wherein a locator is adapted to receive said injector valve and position the injector valve downstream from said metering device; wherein the metering device comprises a piston and cylinder arrangement and the metering device further comprises a magnetic induction device electronically coupled to the piston to provide a measure of the linear movement of the piston.

17. Metering equipment for metering fluid flow through an injector valve comprising a metering device in fluid communication with said injector valve; and wherein a locator is adapted to receive said injector valve and position the injector valve downstream from said metering device;
  wherein the metering device is adapted to act as a pump to cause the flow of fluid through the injector valve;
  wherein the metering device comprises a piston and cylinder arrangement such that the cylinder provides a measuring chamber and linear movement of the piston is indicative of the volume of fluid that flows through the valve; and
  further wherein a source of fluid under pressure is connected to the measuring chamber.

18. Metering equipment according to claim 17, wherein a further source of fluid under pressure is connected to a chamber on the side of the piston opposite the measuring chamber.

19. Metering equipment according to claim 18, wherein the fluid from said further source is gaseous, so as to act more effectively as a spring urging the piston towards the valve when the equipment is in use, whilst still maintaining pressure within a predetermined range.

* * * * *